UNITED STATES PATENT OFFICE.

RAMON QUIJANO, OF SAN ANTONIO, TEXAS.

METHOD OF LIBERATING THE FIBERS OF THE AGAVE AND SIMILAR FLESHY PLANTS.

1,368,750. Specification of Letters Patent. Patented Feb. 15, 1921.

No Drawing. Application filed August 4, 1919. Serial No. 315,244.

*To all whom it may concern:*

Be it known that I, RAMON QUIJANO, a citizen of the Republic of Mexico, residing at San Antonio, in the county of Bexar and State of Texas, have invented certain new and useful Improvements in Methods of Liberating the Fibers of the Agave and Similar Fleshy Plants, of which the following is a specification.

The invention relates to the recovery of commercial fibers from certain varieties of fleshy plants, more especially the wild plants such as grow in Mexico, including the agave, lechuguilla, tula, jaumave, sisal, aloe and pita; henequen, tequila, sotol and maguey; guapilla or huapilla; palma, palma-pita, palmilla and palmetto.

The fibrous nature of many of these plants has been long known and many attempts have been made to recover the fibers from them for commercial purposes. Although some experimenters have endeavored to separate the fibers from the resinous and pulpy content by chemical methods, the universal practice, so far as I am aware, is still the slow, tedious, inefficient and wasteful hand-scraping method.

I have found that by certain treatment, the fibers of these fleshy plants can be completely separated from the binding gums, pulp, etc., and recovered as a high-grade light-colored strong and lustrous fiber, suitable for manufacture of high-grade textiles.

According to my process, the plants, either the whole of the cut plants or the center bunches of fleshy leaves, are assorted according to size of leaf. The leaves are passed through a cane-brake or other suitable crushing device to thoroughly break open the stalks and express the juices. The crushed leaves are then soaked for from three to five days, depending upon the size and age of the leaves, in a bath capable of removing the easily-soluble gums and resins. This bath, which may be warm but not too hot and never at a boiling temperature, may comprise some well known solvent such as benzin, gasolene, etc., but I prefer a fermentive bath. There are various materials which are suitable, including cane-sugar syrup, vinegar and yeast, or even sea-water. The bath chosen will depend largely upon the particular species of plant used, the size or age of the leaves, the character of the gums, etc. Where a fermentive bath is employed, I have found it highly advisable to use in such bath the juices expressed in the crushing operation. By so using these juices, I have found that many hours may be saved in the soaking-step. After soaking as described until the easily-soluble gums from the bulk of the leaves have been loosened or extracted, the leaves are removed and assorted to cull out any which have not been sufficiently soaked. The latter are returned for re-soaking. The remainder of the leaves, that is, those from which the more soluble gums and resins have been extracted are thoroughly washed with water to free them of the extracted gums, the salts formed, etc., and in case an acid or fermentive bath has been employed, a neutralizing agent such as lime is added.

The washed leaves are next boiled with a suitable digestive agent, which may be acid, alkaline or saline, which at the temperature employed dissolves the remaining difficultly-soluble gums. The particular reagent employed and the proportion depend upon the size or age of the leaves, the species of plant being treated and therefore the character of the gums, just as is the case in the soaking-bath. In this boiling-bath the leaves are cooked until the fibers are released from substantially all of the gums and resinous materials of the plant, and can be easily separated out mechanically.

The de-gummed fibers are then separated from the loosened and dissolved gums and from the pulp by any suitable mechanical means known to the art, such as by straining, and are then washed. After this washing they may be re-strained if necessary.

In case the fibers are to be used for ropes, brushes of certain varieties, and other purposes which do not require white fibers, the fibers strained as above described may be dried directly and marketed.

Where very light-colored or white fibers are required, the strained fibers are subjected to a bleaching-bath, which may be a boiling dilute solution of sulfuric acid or a current of chlorin or any other well known bleaching-bath. Certain varieties of the plants enumerated, those of the palma family, have fibers which are so white at the completion of the digestion treatment that no bleaching is necessary. The fibers of the majority of these plants, however, require bleaching to produce the high-grade white fiber desired.

After the bleaching-bath, the fibers are opened up and separated more or less from one another, the binding-tips at the ends are clipped off, and the fibers spread out to dry. It is preferable that this drying be done in the sun, since I have found that sun-drying produces a silky, lustrous appearance which is not easily obtainable by kiln-drying.

The skin or lining of the leaves which separates from the fibers after the boiling operation and the pulp are recovered as a by-product and may be used for paper-making, alcohol manufacture, etc., in any of the well known ways.

As an illustration of my invention, the following example is given, but it is to be understood that the specific conditions and proportions and the materials used will be varied according to the species of plant being treated as well as the age and other conditions of the leaves:

One hundred pounds of average-size leaves of the lechuguilla agave are crushed and placed in a vat containing about one hundred pounds of salt-water. If sea-water is available this may be used; if not, a salt-solution of about the strength of sea-water is employed. To the bath is preferably added the expressed juices of the batch of leaves. The leaves are allowed to soak in the fermentive brine bath until upon examination it is found that the fibers are partly liberated by solution or softening of the easily-soluble gums. This may take from three to five days. Slight warming of the soaking is desirable since it hastens the fermentation and the breaking down of the gums. Warming of the bath is necessary if the temperature of the water used is as low as say, 50° F. Temperatures above 140°—150° F. are of course impossible in a fermentive bath and are undesirable in any case since at higher temperatures the easily-soluble gums begin to tighten up and become insoluble even in the boiling-bath. When found to be in condition, the stock is removed from this bath and subjected to a thorough washing so as to clean the fibers as thoroughly as possible. Lime-water or some other alkaline solution is used to neutralize the stock which has become acid in the fermentation-step.

The washed stock is then subjected to a boiling-bath comprising a solution of caustic soda or sodium carbonate. This bath may contain about one gallon of liquor to each pound of leaves. If caustic soda is used, a suitable proportion is approximately 1½ per cent. by weight of the bath-content. Various other digestive agents such as chlorid of lime, hydrochloric acid, etc., may be used. If hydrochloric acid is used, care should be taken that too great a quantity is not employed as it will materially weaken or destroy the fiber. Less than one per cent. is probably safe for all cases. In this boiling-bath the leaves are allowed to remain until the fibers readily separate and fall freely apart, or in other words until the binding-gums are all broken down or removed. This takes comparatively a short time, usually about one-half hour.

The de-gummed fibers are removed from the hot bath and separated by screening or otherwise from the non-fibrous materials. They are then subjected to a suitable bleaching-bath consisting, say, of a sulfuric acid solution, preferably boiling, the strength of which may be from one and one-half to two per cent. by weight. This bleaching-bath requires ordinarily less than half an hour.

After bleaching, the fibers are washed and spread out in the sun to dry. In average sunshine about a day's time is ample for this drying and the supplemental bleaching which is derived from the sun-rays.

It will be obvious that certain of the steps described may be modified, and that some of them may even be omitted without seriously interfering with the process. It is essential, however, that the boiling operation follow the preliminary soaking, and neither of these steps can be omitted nor can they be reversed in order. The soaking-step not only enables the boiling operation to be carried out in a much shorter time, but, what is more important, I have found that where it is employed a much greater proportion of the leaves are freed in the boiling operation and a greater proportion of the leaves are available for use.

For some reason the plants of the character described do not readily yield up their fibers in the ordinary retting process, so that it is impractical to treat them in this manner. Even a soaking for several weeks in macerating-baths such as I have described is not sufficient to liberate the fibers in a paying proportion, especially from the full grown leaves. Nor will the boiling operation alone serve to free the fibers. It seems that these plants contain certain easily-soluble gums which the soaking-step will remove but which become substantially insoluble in the boiling-bath.

My process increases the production of fibers from the plants very materially and greatly cuts the cost of production. In addition, a much more marketable fiber is produced than can possibly be obtained with any methods of fiber-liberation heretofore known.

I claim:—

1. The method of recovering the fibers from fleshy plants of the agave and similar genera, which consists in crushing the cut plants, soaking the leaves in a bath capable of removing the easily-soluble gums, washing the partially de-gummed leaves, and boiling in a digestive agent capable of removing the remaining gums.

2. The method of recovering the fibers from fleshy plants of the agave and similar genera, which consists in crushing the cut plants and thereby expressing the juices, soaking the leaves in a fermentive bath containing the expressed juices until the easily-soluble gums are removed, washing the partially de-gummed leaves in a neutralizing medium, and boiling in a digestive agent capable of removing the remaining gums.

3. The method of recovering the fibers from fleshy plants of the agave and similar genera, which consists in crushing the cut plants, soaking the leaves at substantially normal temperature in a bath capable of removing the easily-soluble gums, washing the partially de-gummed leaves, boiling in a digestive agent capable of removing the remaining gums, separating the liberated fibers from the non-fibrous residues of the digestion, and bleaching the fibers.

4. The method of recovering the fibers from fleshy plants of the agave and similar genera, which consists in crushing the cut plants, soaking the leaves at substantially normal temperature in a bath capable of removing the easily-soluble gums, assorting the soaked leaves, re-soaking the leaves of which the easily-soluble gums are not removed, washing the partially de-gummed leaves, boiling them in a digestive agent capable of removing the remaining gums, and separating the liberated fibers from the non-fibrous residues of the digestion.

5. The method of recovering the fibers from fleshy plants of the agave and similar genera, which consists in crushing the cut plants and thereby expressing the juices, soaking the leaves in a fermentive bath containing the expressed juices until the easily-soluble gums are removed, thoroughly washing and cleaning the partially de-gummed leaves in a neutralizing medium, boiling in a digestive agent capable of removing the remaining gums, separating the liberated fibers from the non-fibrous residues of the digestion, subjecting the fibers to a bleaching-bath, and drying them in the sun.

In testimony whereof, I affix my signature.

RAMON QUIJANO.